US009965172B2

(12) United States Patent
Hwang et al.

(10) Patent No.: US 9,965,172 B2
(45) Date of Patent: May 8, 2018

(54) VIDEO TRANSITION METHOD AND VIDEO TRANSITION SYSTEM

(71) Applicant: NAVER CORPORATION, Seongnam-Si, Gyeonggi-Do (KR)

(72) Inventors: Seil Hwang, Seongnam-si (KR); Naeun Kim, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 372 days.

(21) Appl. No.: 14/558,352

(22) Filed: Dec. 2, 2014

(65) Prior Publication Data

US 2015/0160853 A1 Jun. 11, 2015

(30) Foreign Application Priority Data

Dec. 5, 2013 (KR) ........................ 10-2013-0150648

(51) Int. Cl.
*G06F 3/0488* (2013.01)
*G06F 3/0484* (2013.01)
(Continued)

(52) U.S. Cl.
CPC ...... *G06F 3/04883* (2013.01); *G06F 3/04842* (2013.01); *H04N 21/42224* (2013.01); *H04N 21/47217* (2013.01); *H04N 21/812* (2013.01)

(58) Field of Classification Search
CPC ............. H04N 21/4312; H04N 21/812; H04N 21/41407; H04N 21/47217;
(Continued)

(56) References Cited

U.S. PATENT DOCUMENTS 8,255,495 B1 * 8/2012 Lee ........................ G06Q 30/00 709/203
8,677,284 B2 * 3/2014 Aguilar ............... G06F 3/04815 715/830
(Continued)

FOREIGN PATENT DOCUMENTS

JP 2010-526497 A 7/2010
JP 2012-253617 A 12/2012
(Continued)

OTHER PUBLICATIONS

Korean Office Action dated Feb. 9, 2015 issued in corresponding Korean Application No. 10-2013-0150648.
(Continued)

*Primary Examiner* — Andrew Tank
(74) *Attorney, Agent, or Firm* — Harness, Dickey & Pierce, P.L.C.

(57) ABSTRACT

Disclosed are a video transition method and system, including performing a screen transition operation from a first moving picture to a second moving picture in response to a first transition gesture input during playing the first moving picture when the first moving picture and a second moving picture connected with the first moving picture are sequentially played at predetermined times, suspending the first moving picture being played and playing the second moving picture in response to a completion in the screen transition operation to the second moving picture, performing a screen transition operation from the second moving picture to the first moving picture in response to a second transition gesture input during playing the second moving picture, and suspending the second moving picture being played and playing the first moving picture in response to a completion in the screen transition operation to the first moving picture.

20 Claims, 10 Drawing Sheets

(51) Int. Cl.
*H04N 21/472* (2011.01)
*H04N 21/81* (2011.01)
*H04N 21/422* (2011.01)

(58) Field of Classification Search
CPC .......... H04N 21/42224; G06F 3/04883; G06F 3/04842; G06Q 30/02
USPC .......................................... 715/863; 705/14.4
See application file for complete search history.

(56) References Cited

U.S. PATENT DOCUMENTS

| | | | | |
|---|---|---|---|---|
| 2008/0276269 | A1 | 11/2008 | Miller et al. | |
| 2009/0037971 | A1 * | 2/2009 | Lim | H04N 5/4403 725/131 |
| 2009/0058822 | A1 * | 3/2009 | Chaudhri | G06F 3/04883 345/173 |
| 2012/0137216 | A1 | 5/2012 | Choi | |
| 2013/0166393 | A1 | 6/2013 | Lee et al. | |
| 2014/0176479 | A1 * | 6/2014 | Wardenaar | G11B 27/34 345/173 |
| 2014/0215542 | A1 * | 7/2014 | Terpe | H04N 21/4126 725/112 |
| 2014/0279028 | A1 * | 9/2014 | Doser | G06Q 30/0267 705/14.64 |

FOREIGN PATENT DOCUMENTS

| | | | |
|---|---|---|---|
| JP | 2013-134770 | A | 7/2013 |
| JP | 2013-156761 | A | 8/2013 |
| JP | 2013-175188 | A | 9/2013 |
| KR | 20080093567 | A | 10/2008 |
| KR | 2010-0036134 | A | 4/2010 |
| KR | 2013-0097372 | A | 9/2013 |
| WO | WO 2012-124327 | A1 | 9/2012 |
| WO | WO 2013/089013 | A1 | 6/2013 |
| WO | WO 2014/142301 | A1 | 9/2014 |

OTHER PUBLICATIONS

Japanese Office Action dated Dec. 1, 2015 issued in corresponding Japanese Application No. 2014-203165.

* cited by examiner

VIDEO TRANSITION METHOD AND VIDEO TRANSITION SYSTEM

CROSS-REFERENCE TO RELATED APPLICATION

This application claims priority from and the benefit of Korean Patent Application No. 10-2013-0150648, filed on Dec. 5, 2013, which is hereby incorporated by reference in its entirety for all purposes as if fully set forth herein.

BACKGROUND

Field

Example embodiments relate to methods and systems for performing a transition from a moving picture currently being played to another moving picture.

Description of the Background

A rapid increase in users of a high-speed communication network has enabled the developments of new services and the diversification of service items through communication networks. A general service among services using communication networks include moving picture providing services that provide, for example, video downloads and/or video streaming services.

The moving picture providing service provides a list of moving pictures that may include a list of videos to a user so that the user may select a desired moving picture from the list of moving pictures. For example, Korean Patent Laid-Open Publication No. 10-2008-0093567, published on Oct. 22, 2008, discloses technology for providing a list of moving pictures and a preview of a moving picture selected from the list of moving pictures.

However, in the related art, to view another moving picture while currently viewing a moving picture, a user likely has to move to a list of moving pictures and select a desired moving picture from the list of moving pictures. In addition, to view again a previously viewed moving picture, the user may have to perform a transition to the previously viewed moving picture by moving to the list of moving pictures and then retrieving the previously viewed moving picture in the same manner, or by executing a separate menu.

SUMMARY

At least one example embodiment relates to a video transition method performed by a user terminal.

According to an example embodiment, a video transition method performed by a user terminal includes receiving a first transition gesture while a first moving picture is displayed by the user terminal, the first transition gesture indicating to transition from the first moving picture to a second moving picture; transitioning from the first moving picture to the second moving picture by performing a first screen transition operation in response to receiving the first transition gesture; suspending the display of the first moving picture in response to performing the first screen transition operation; displaying the second moving picture when the first screen transition operation is completed; receiving a second transition gesture while a second moving picture is displayed by the user terminal, the second transition gesture indicating to transition from the second moving picture to a first moving picture; transitioning from the second moving picture to the first moving picture by performing a second screen transition operation in response to receiving the second transition gesture; suspending the display of the second moving picture in response to performing the second screen transition operation; and resuming the displaying of the first moving picture when the second screen transition operation is complete.

Example embodiments provide that performing the first screen transition operation includes performing a first screen transition effect corresponding to an input direction of the first transition gesture, and performing the second screen transition operation includes performing a second screen transition effect corresponding to an input direction of the second transition gesture.

Example embodiments also provide that the second moving picture is an advertisement video, the advertisement video being played at one of before and during the display of the first moving picture.

Example embodiments provide that the first transition gesture is a desired gesture performed in a first direction, and the second transition gesture is the desired gesture performed in a second direction.

Example embodiment provide that the first transition gesture is input at a first desired location of a screen of the user terminal when the first moving picture is displayed, and the second transition gesture is input at a second desired location of the screen when the second moving picture is displayed.

Example embodiments provide that the method includes displaying a first inducement element on a screen of the user terminal when the first moving picture is displayed, the first inducement element inducing the first transition gesture; and displaying a second inducement element on the screen when the second moving picture is displayed, the second inducement element inducing the second transition gesture.

Example embodiments provide that the displaying of the first inducement element includes displaying the first inducement element when the first moving picture is suspended; and displaying the first inducement element when a user interface (UI) associated with the first moving picture is displayed, the UI allowing the user terminal to control a play function of the first moving picture.

Example embodiments provide that the displaying of the second inducement element includes displaying the second inducement element at a start of the displaying of the second moving picture; and displaying the second inducement element when a desired period of time has elapsed since the start of the displaying of the second moving picture.

Example embodiments provide that the first inducement element includes first guide information indicating how to perform the first transition gesture, and the second inducement element includes second guide information indicating how to perform the second transition gesture.

Example embodiments provide that the first inducement element includes at least one of (i) an image associated with the second moving picture and (ii) text associated with the second moving picture, and the second inducement element includes the at least one of (i) the image associated with the second moving picture and (ii) the text associated with the second moving picture.

Example embodiments provide that the resuming the displaying of the first moving picture includes displaying the first moving picture at a point in time of the suspending the display of the first moving picture.

Example embodiments provide that the first screen transition operation is performed in response to a selection of the first inducement element, and the second screen transition operation is performed in response to a selection of the second inducement element.

At least one example embodiment relates to a computer readable media comprising program code, which when executed by a processor of a user terminal, configures the processor to perform various functions according to the example embodiments.

At least on example embodiment relates to a user terminal configured to perform a video transition method.

According to an example embodiment, a user terminal includes a processor configured to receive a first transition gesture while a first moving picture is displayed by the user terminal, the first transition gesture indicating to transition from the first moving picture to a second moving picture; transition from the first moving picture to the second moving picture by performing a first screen transition operation in response to receiving the first transition gesture; suspend the display of the first moving picture in response to performing the first screen transition operation; display the second moving picture when the first screen transition operation is completed; receive a second transition gesture while a second moving picture is displayed by the user terminal, the second transition gesture indicating to transition from the second moving picture to a first moving picture; transition from the second moving picture to the first moving picture by performing a second screen transition operation in response to receiving the second transition gesture; suspend the display of the second moving picture in response to performing the second screen transition operation; and resume the displaying of the first moving picture when the second screen transition operation is complete.

Example embodiments provide that the processor is further configured to display a first inducement element on a screen of the user terminal when the first moving picture is displayed, the first inducement element inducing the first transition gesture; and display a second inducement element on the screen when the second moving picture is displayed, the second inducement element inducing the second transition gesture.

Example embodiments provide that, in the displaying of the first inducement element, the processor is further configured to display the first inducement element when the first moving picture is suspended; and display the first inducement element when a user interface (UI) associated with the first moving picture is displayed, the UI allowing the user terminal to control a play function of the first moving picture.

Example embodiments provide that in the displaying of the second inducement element, the processor is further configured to display the second inducement element at a start of the displaying of the second moving picture; and display the second inducement element when a desired period of time has elapsed since the start of the displaying of the second moving picture.

Example embodiments provide that the first inducement element includes first guide information indicating how to perform the first transition gesture, and the second inducement element includes second guide information indicating how to perform the second transition gesture.

Example embodiments provide that, in the resuming the displaying of the first moving picture, the processor is further configured to display the first moving picture at a point in time of the suspending the display of the first moving picture.

Example embodiments provide that the first screen transition operation is performed in response to a selection of the first inducement element, and the second screen transition operation is performed in response to a selection of the second inducement element.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
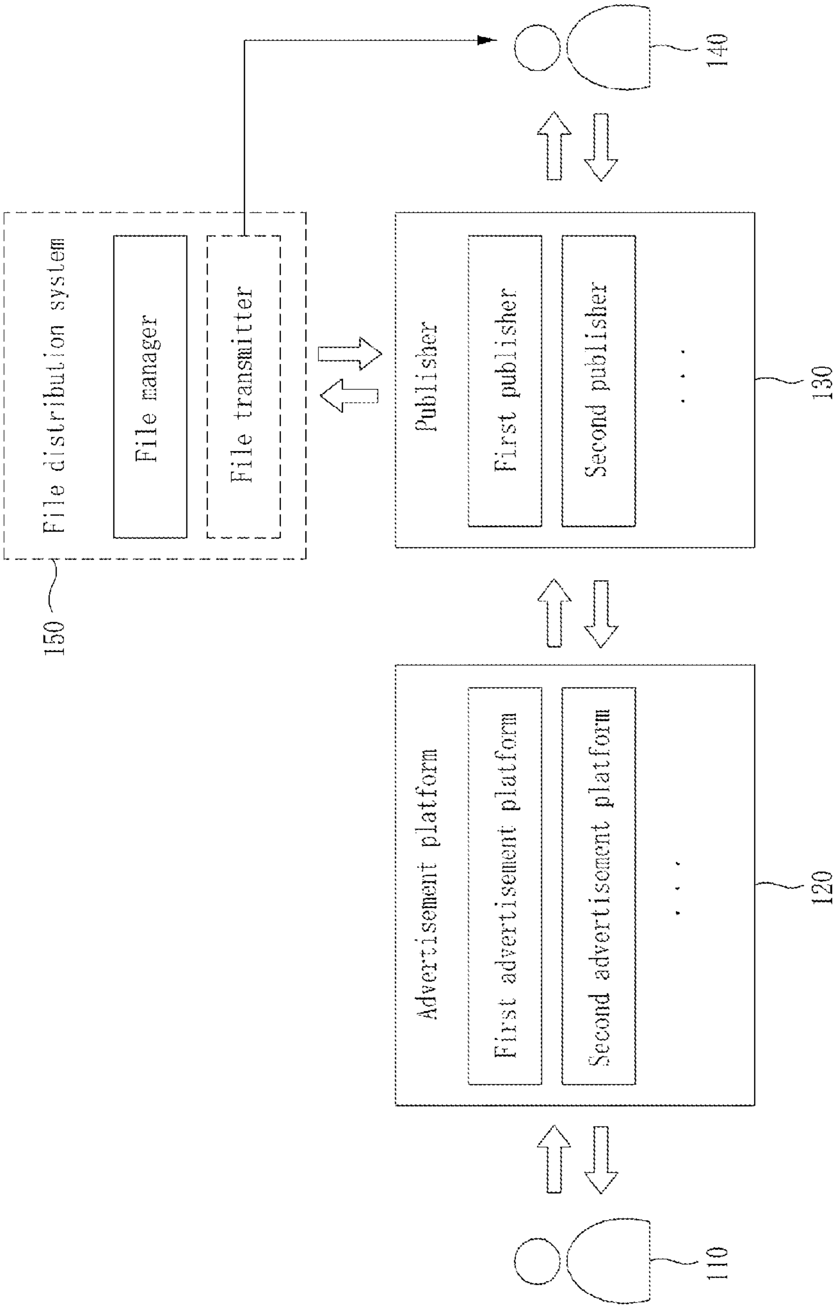
FIG. 1 illustrates an example of an advertisement providing environment according to example embodiments.

The example embodiments are described more fully hereinafter with reference to the accompanying drawings, in which example embodiments are shown. The example embodiments may, however, be embodied in many different forms and should not be construed as limited to the example embodiments set forth herein. Rather, these example embodiments are provided so that this disclosure is thorough, and will fully convey the scope of the example embodiments to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as “beneath,” “below,” “lower,” “above,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Expressions such as “at least one of,” when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments, when a sub-moving picture is connected with a main moving picture, a transition between the main moving picture and the sub-moving picture may be performed on a screen without using a list of moving pictures and/or executing a separate menu.

According to example embodiments, when an advertisement video is connected with a moving picture, the advertisement video may be provided in a recallable form at a point in time desired by a user beyond an advertisement form of displaying the advertisement video once. In such embodiments, a transition from a moving picture being played to a previous advertisement video having been viewed may be performed using a flicking gesture and/or other like gestures on a touchscreen device. By providing a natural and free transition function between the moving picture and the advertisement video using a mobile touch environment, a user may view again the advertisement video during playing the moving picture through a simple flicking gesture and/or other like gesture. Accordingly, it is possible to satisfy a demand and convenience of the user for viewing again an advertisement. Furthermore, an advertisement effect of an advertiser may be enhanced by increasing an advertisement recognition rate and enhancing the access readability through an advertisement redisplay.

Hereinafter, example embodiments will be described with reference to the accompanying drawings.

FIG. 1 illustrates an example of an advertisement providing environment according to example embodiments. The advertisement providing environment includes an advertiser 110, an advertisement platform 120, a publisher 130, and a user 140. Referring to FIG. 1, lines with arrowheads present among the advertiser 110, the advertisement platform 120, the publisher 130, and the user 140 may indicate that data may be transmitted and received among terminals used by the advertiser 110, the advertisement platform 120, the publisher 130, and a terminal used by the user 140 over a wired/wireless network.

According to various embodiments, the advertiser 110 and the user 140 may be hardware computing devices capable of communicating with a server (e.g., the advertisement platform 120), such that each of the advertiser 110 and the user 140 are able to receive services from the server. The services may include a video providing service, an advertisement providing service, and the like. The advertiser 110 and the user 140 may include memory, one or more processors, and transceiver. The advertiser 110 and the user 140 may be configured to send/receive data to/from network devices, such as a router, switch, or other like network devices, via a wired connection, a wireless connection (i.e., an air interface), and/or any other like tangible and intangible medium. The advertiser 110 and the user 140 may be designed to sequentially and automatically carry out a sequence of arithmetic or logical operations; equipped to record/store digital data on a machine readable medium; and transmit and receive digital data via one or more network devices. The advertiser 110 and the user 140 may include devices such as desktop computers, laptop computers, cellular phones and/or smartphones, tablet personal computers, and/or any other physical or logical device capable of recording, storing, and/or transferring digital data via a connection to a network device. The advertiser 110 and the user 140 may include a transmitter/receiver (or transceiver) configured to operate in accordance with wireless communications standard.

According to various embodiments, the advertisement platform 120, the publisher 130, and the file distribution system 150 may include one or more physical computer hardware systems that are configured to provide services for client devices (e.g., the advertiser 110 and the user 140) connected to a communications network. The advertisement platform 120, the publisher 130, and the file distribution system 150 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The advertisement platform 120, the publisher 130, and the file distribution system 150 may be configured to establish, manage, and terminate one or more communications sessions between one or more computing devices.

According to various embodiments, advertisement platform 120, the publisher 130, and/or the file distribution system 150 may be connected to one or more local and/or remote databases (not shown). In various embodiments, the one or more databases may include a database management system ("DBMS"), a relational database management system ("RDBMS") database, an object database ("ODBMS"), column-oriented DBMS, correlation database DBMS, and/or other like database management systems. In various embodiments, the one or more databases may be used by the publisher 130 to store and record playback related information in order to recall and provide a moving picture and/or an advertisement video to a user terminal (i.e., user 140). In such embodiments, the one or more databases may be configured to store a point in time when a user initiates or otherwise issues a screen transition operation to a second moving picture during a display of a first moving picture. The publisher 130 may then query the one or more databases or otherwise determine from the one or more databases the point in time of the screen transition operation in order to provide the first moving picture at the point in time of the screen transition operation.

According to various embodiments, the advertiser 110, the user 140, the advertisement platform 120, the publisher 130, and the file distribution system 150 may communicate with each other via a communications network (not shown). The communications network may be any interconnected network of computing devices. The communications network may be configured to operate various communication networks such as a personal area network (PAN), a local area network (LAN), a metropolitan area network (MAN), or a wide area network (WAN). Further, the communications network may be the internet. In some embodiments, the communications network may use a wireless transmission technique which is used for a short range communication, such as infrared data association (IrDA) or a Bluetooth.

The advertisement platform 120 may perform an advertisement auction (e.g., allowing the advertiser 110 to bid on exposing an advertisement of the advertiser 110), matching an advertisement with one or more keywords, sorting advertisements or advertisers, providing advertisements to the publisher 130, charging for displaying an advertisement, and/or other like advertising platform functions. With respect to general and technical aspects of the advertisement platform 120, description construable with reference to related arts of a search advertisement and/or a banner advertisement platform delivered through the Internet is omitted.

It should be noted that the term "publisher" may be interchangeably used with the term "site" and/or "website". However, description using the term "site" and/or "website" is not to be constructed as excluding a probability that example embodiments may be carried out in an environment beyond a general website connection, such as an application screen executed on a mobile terminal. The term "site" and/or "website" may be compatibly used with "publishing site", a "publisher", and/or other like known terms. In various embodiments, each site may correspond to an individual publisher. For example, a first publisher and a second publisher may be included in the publisher 130. Here, the term "site" may include any type of website through which an advertisement may be displayed. The site may be provided to the user 140 over a wired or wireless network. The site may also indicate a single webpage configuring a website.

It should also be noted that the terms "display", "displaying", "play", and/or "playing" may be used interchangeably. The terms "display", "displaying", "play", and/or "playing" may refer to playing back of text data, audio data, video data, and/or any other like multimedia data.

It should also be noted that the terms "displaying", and/or "displaying an advertisement" may be interpreted as providing promotional content (e.g., text, image, audio, video, and/or hyperlinks) associated with the advertiser 110 to a visitor of a corresponding site through the site or the publisher. Further, a "selection" on the displayed advertisement may indicate an occurrence of a situation in which the user 140 selects and/or chooses promotional content of the advertiser 110. For example, a site visitor may select a displayed advertisement using a mouse click or a touch on a touchscreen with respect to the promotional content provided through the site. The "selection" on the displayed advertisement may also indicate an occurrence of a situation in which the user 140 selects and/or chooses promotional content of the advertiser 110 and performs a desired action or actions intended by the advertiser 110. For example, the situation intended by the advertiser 110 may include a situation in which a webpage associated with the advertiser 110 is displayed to a visitor selecting an advertisement and a situation in which the visitor performs an act, such as joining a page and/or service associated with the advertiser 110 and/or purchasing a product associated with the advertiser 110. The performance of a desired act may be referred to as a "target act" and/or "target action".

Referring to FIG. 1, the publisher 130 may provide a site of the publisher 130 to the user 140. The publisher 120 may provide pages included in the site to the user 140 based on a request for content submitted to the site, or may provide a search result associated with a keyword to the user 140 in response to the keyword input by the user 140 through the site. Here, the publisher 130 may receive, from the advertisement platform 120, advertisements to be displayed through pages and may provide the advertisements to the user 140. For example, the publisher 130 may receive, from the advertisement platform 120, advertisements associated with a keyword input from the user 140 and may provide the advertisements to the user 140 as a search result list. The search result list may include both organic search results and sponsored search results. The organic search results may be listings in the search result list that appear because of their relevance to the search term(s) entered by the user 140. The sponsored search results may be non-organic search results in the search result list that appear based on one or more of bid price, expected click-through rate, keyword relevancy, site quality, and/or other like criteria.

The publisher 130 may display a path, for example, a screen, via which the user 140 receives an advertisement. For example, in an online environment, advertisements may be displayed through a website. Each of a plurality of individual advertisement platforms (e.g., a first advertisement platform and a second advertisement platform included in the advertisement platform 120) may display an advertisement through at least one individual publisher among a plurality of publishers (e.g., a first publisher and a second publisher included in the publisher 130). In various embodiments, each of the plurality of individual publishers may display the advertisement to the user 140 through at least one site. In addition to displaying the advertisement, each of the plurality of individual publishers may further provide at least one service among a variety of services capable of being provided over a wired and/or wireless network, such as an integrated search service and/or search engine service, a blog service, a social network service, a multimedia providing service, and/or other like services.

According to various example embodiments, a video transition system may refer to a computer system that constitutes a single advertisement platform among the plurality of individual advertisement platforms, may refer to a computer system that constitutes a single publisher among the plurality of individual publishers, and/or may refer to a computer system that constitutes a terminal of the user 140.

In FIG. 1, a file distribution system 150 may be selectively used depending on services desired by a user. For example, when the user 140 uses a mobile terminal, the file distribution system 150 may provide the user 140 with a file for installing an application associated with the publisher 130 in the mobile terminal. To this end, the file distribution system 150 may include a file manager configured to store and maintain the file and a file transmitter configured to transmit the file to the mobile terminal in response to a request of the mobile terminal. The application may be installed in the mobile terminal using the transmitted file. The application may control and/or configure the mobile terminal to perform operations of a video transition method according to example embodiments.

Figure 2:
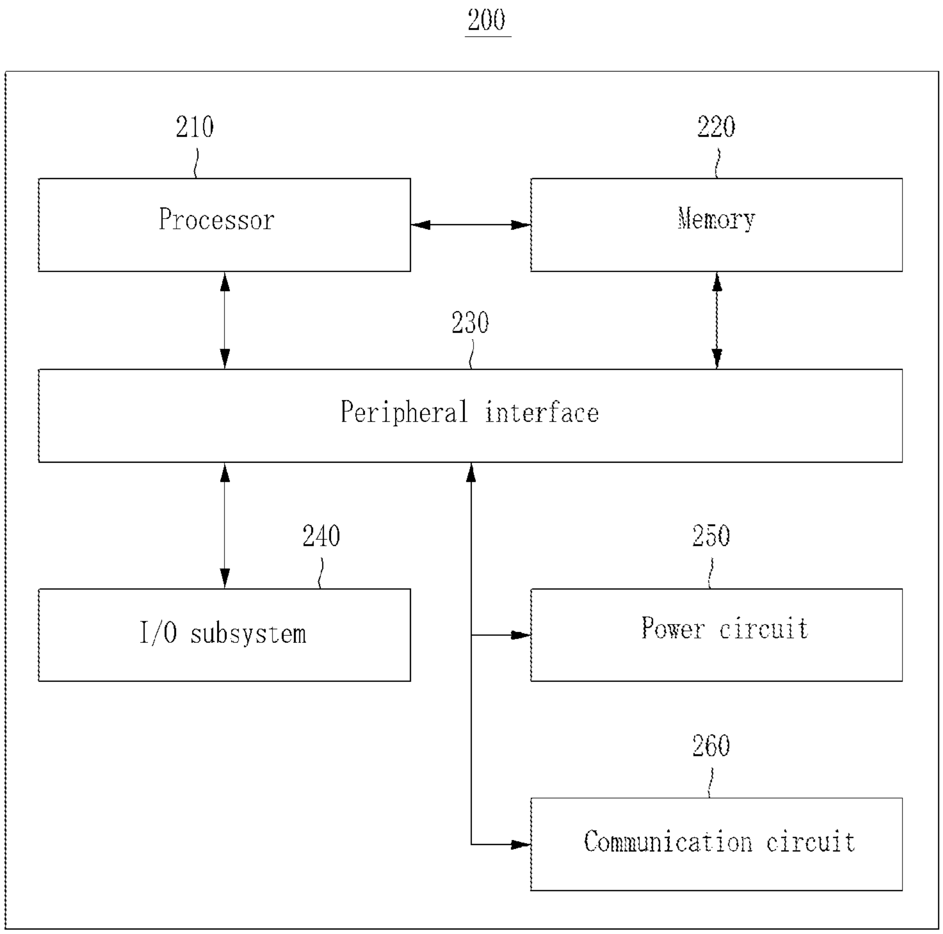
FIG. 2 illustrates an example of a configuration of a computer system according to example embodiments.

FIG. 2 illustrates an example of a configuration of a computer system 200 according to example embodiments. Referring to FIG. 2, the computer system 200 may include at least one processor 210, a memory 220, a peripheral interface 230, an input/output (I/O) subsystem 240, a power circuit 250, and a communication circuit 260. It should be noted that the advertiser 110, the user 140, the advertisement platform 120, the publisher 130, and the file distribution system 150 are computing devices that have a same or similar components and/or configuration as computer system 200. Furthermore, in some embodiments, the computer system 200 may include many more components than those shown in FIG. 2. However, it is not necessary that all of these generally conventional components be shown in order to understand the example embodiments.

The computer system 200 of FIG. 2 is only an example and thus, may further include additional components not illustrated in FIG. 2 or may have a configuration or an arrangement in which at least two components are combined. For example, the computer system 200 for a mobile terminal may include a touch screen (not shown) and one or more sensors (not shown) in addition to the components of FIG. 2. By way of another example, a circuit for radio frequency (RF) communication may be included in the communication circuit 260 (not shown). The components included in the computer system 200 may be configured as hardware including an integrated circuit specialized for processing at least one signal. The components of the computer system 200 may also include an application, software components, and the like in combination with the hardware.

The memory 220 is a hardware device configured to store program code for one or more operating systems and/or program code for performing operations according to example embodiments. The program code may include software modules, firmware, middleware, microcode, hardware description languages, and/or any other like set of instructions. The memory 220 may include, for example, a high-speed random access memory (RAM), a magnetic disk, a static random access memory (SRAM), dynamic RAM (DRAM), a read only memory (ROM), a flash memory, and/or a non-volatile memory. The memory 220 may provide the stored program code, software modules, firmware, middleware, microcode, hardware description languages, and/or any other like set of instructions required for performing the operations of the computer system 200 to one or more other components. Here, an access from another component such as the processor 210 or the peripheral interface 230 to the memory 220 may be controlled by the processor 210.

The peripheral interface 230 may combine an I/O peripheral device of the computer system 200 with the processor 210 and the memory 220. The processor 210 may perform a variety of functions for the computer system 200 and may process data by executing the program code, the one or more software modules, firmware, middleware, microcode, hardware description languages, and/or any other like set of instructions stored in the memory 220. In order to perform the variety of functions and data processing operations, the program code is loaded into the processor 210. Once the program code is loaded into the processor 210, the processor 210 may be programmed to perform the various operations and functions delineated by the program code, thereby transforming the processor 210 into a special purpose processor.

In various embodiments, the program code may also be loaded into the processor 210 and/or the memory 220 from a separate computer readable storage medium using a drive mechanism (not shown). Such separate computer readable storage medium may include a magnetic disc, DVD/CD-ROM/Blu-ray drive, memory card, USB flash drive, memory stick, and/or other like computer readable storage medium (not shown). In some embodiments, software components may be loaded into the processor 210 and/or the memory 220 from a wired or wireless network via a network interface and/or communications circuit 260, rather than via a computer readable storage medium.

The I/O subsystem 240 is a hardware device that provides an interface between peripheral devices and the processor 210. The I/O subsystem 240 may combine a variety of I/0 peripheral devices with the peripheral interface 230. For example, the I/O subsystem 240 may include a controller configured to combine a peripheral device, such as a monitor, a keyboard, a mouse, and a printer, or a touch screen or a sensor depending on a necessity, with the peripheral interface 230. The I/O peripheral devices may also be combined with the peripheral device 230 without using the I/O subsystem 240.

The power circuit 250 may supply power to a portion of or all of the components included in the computing system 200. For example, the power circuit 250 may include a power management system, at least one power source such as a battery and alternating current (AC), a charging system, a power failure detection circuit, a power converter or inverter, a power state indicator, and other components for power generation, management, and distribution.

The communication circuit 260 1231 is a hardware device that enables communication with one or more other communications system using at least one external port. In various embodiments, as described above, the communication circuit 260 may also enable communication with other computer systems by including an RF circuit and thereby transmitting and receiving an RF signal known as an electromagnetic signal. The communication circuit 260 may communicate with the other computer systems via a cellular phone network, a wireless network such as a WLAN and/or metropolitan area network (MAN), an Internet network such as an intranet and/or World Wide Web (WWW). The wireless communication may include Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other like communication protocols. The wireless communication may employ a plurality of communication standards, protocols, and technologies, without being limited to the above examples.

In various embodiments, the communication circuit 260 may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols).

Example embodiments relate to interaction technology for performing a transition from a moving picture being played to another moving picture connected therewith. In detail, example embodiments relate to a screen transition interaction between a main moving picture and a sub-moving picture when at least one sub-moving picture is connected with the main moving picture. Hereinafter, a description will be made based on an example of using an advertisement video as a representing example of a sub-moving picture.

Initially, an advertiser may register, with an advertisement platform, an advertisement source for producing and/or exposing an advertisement through the advertiser platform. Here, the advertisement source may include an image or a moving picture (e.g., video content), and may also include a title and description (T&D) and a representative image. Further, the advertiser may register keywords for the advertisement source such that the registered keywords are associated with the advertisement source.

Accordingly, the advertisement platform may register video content (hereinafter, also referred to as an "advertisement video") to be associated with the advertisement source. Further, the advertisement platform may store and manage the registered keywords in association with the advertisement video.

Meanwhile, a publisher may provide a variety of moving picture and/or video content (hereinafter, also referred to as a "moving picture") to a user through a site. Here, the publisher may provide a plurality of moving pictures to the user by connecting at least one sub-moving picture to any one moving picture corresponding to main content. The publisher may configure the main moving picture and the sub-moving picture to be sequentially played at desired (or alternatively, "predetermined") times. As an example, the publisher may receive an advertisement video from the advertisement platform associated with a moving picture that corresponds to main content. The publisher may provide the advertisement video to the user in connection with the moving picture. The advertisement platform may select and provide an advertisement video irrelevant to the moving picture, or may extract and provide an advertisement video relevant to the moving picture. With regard to irrelevant videos, in some embodiments, the advertisement platform may randomly select and provide the irrelevant advertisement video to the moving picture. With regard to relevant videos, in various embodiments the advertisement video relevant to the moving picture may be selected as a result of comparing a keyword extracted from the moving picture and a keyword registered in association with the advertisement video. The comparison between keywords may employ technologies for measuring the relevance between words based on context, expressions, language patterns, phonemes, syllables, letters, base pairs, n-grams, and the like.

The publisher may configure the advertisement video provided from the advertisement platform as an "in-stream" type advertisement video to be displayed within a moving picture player. An "in-stream" advertisement video is an advertisement video that is placed within a moving picture that is streaming online (i.e., a "streaming video", a "streaming moving picture", and the like). The publisher may display the in-stream advertisement at a point in time corresponding to at least one of before, during, and after displaying the advertisement video. The advertisement video may be classified as a pre-roll advertisement, a mid-roll advertisement, or a post-roll advertisement based on a play point in time of the advertisement video. Furthermore, the in-stream advertisement video may include a companion advertisement and/or an interactive advertisement. The companion banner advertisement may be an advertisement (e.g., a banner advertisement) that is displayed in a webpage that includes the moving picture player and may be displayed before, during, and after the moving picture is displayed. The interactive advertisement may be an advertisement that is displayed over the in-stream advertisement video and/or the moving picture as the in-stream advertisement video and/or the moving picture is being displayed. The interactive advertisement may close or otherwise terminate after the in-stream advertisement video completes or continue through the entire display of the moving picture.

FIGS. 3 through 8 illustrate examples of a transition process between a moving picture and an advertisement video according to example embodiments. FIGS. 3 through 8 illustrate example embodiments of a screen of a mobile terminal (e.g., user 140) on which a moving picture and an advertisement video are displayed, where the moving picture is associated with a publisher (e.g., publisher 130).

Figure 3:
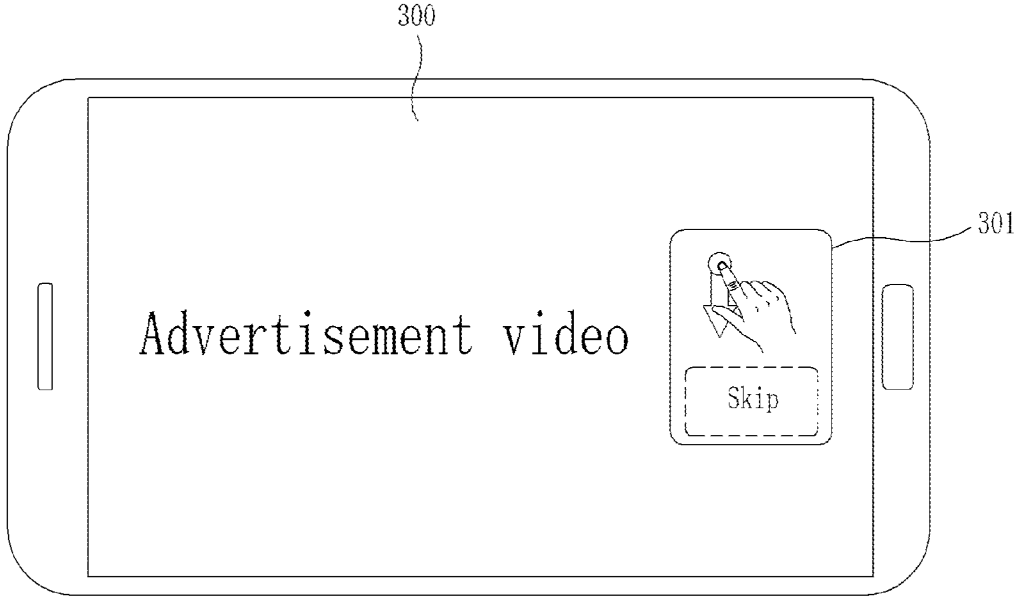
FIGS. 3 through 8 illustrate examples of a transition process between a moving picture and an advertisement video according to example embodiments.

FIG. 3 illustrates an example embodiment of an advertisement screen 300. The advertisement screen 300 may be configured as a screen on which an advertisement video is initially played in a pre-roll form (i.e., the advertisement video is played before the playing of the moving picture), or a screen on which the advertisement video is played in a mid-roll form (i.e., the advertisement video is played at some point during the playing of the moving picture). In various embodiments, the mid-roll advertisement video may be played when the moving picture is buffering a data stream in course of playing the moving picture. Here, the advertisement screen 300 refers to a screen on when the advertisement video is initially played before or during playing the moving picture.

If a desired (or alternatively, "predetermined") period of time (e.g., five seconds) is elapsed after starting playing the advertisement video, a moving picture transition inducement element 301 may be displayed as a user interface (UI) element, which is capable of inducing a screen transition to a moving picture. The moving picture transition inducement element 301 may be displayed on one side area of the advertisement screen 300. As shown in FIG. 3, the moving picture transition inducement element 301 is displayed on a right side of the advertisement screen 300. As an example, the moving picture transition inducement element 301 may include guide information that indicates a command for producing a screen transition. The guide information and/or "advertisement-moving picture gesture" may include gesture information which indicates a gesture to be performed for issuing the command A "gesture" may refer a combination of one or more touches and/or other like movements that may be performed on a touchscreen device for providing an input command to the touchscreen device. A gesture may include tapping, double tapping, long press, pinch open, pinch close, panning flicking, dragging, rotate, two-finger tapping, two-finger-scrolling, and/or other like movements, Additionally, a gesture may include holding a touch and/or movement for a desired period of time, performing a touch and/or movement in a desired position and/or in a desired direction, performing a combination of touches and/or movement in a desired sequence.

For example, as shown in FIG. 3, a gesture image included in the moving picture transition inducement element 301 indicates that a downward flicking gesture provides a screen transition function to a moving picture. Also, the moving picture transition inducement element 301 may include a subtext that describes a function corresponding to the advertisement-moving picture gesture. For example, as shown in FIG. 3, the subtext "skip" is shown, which may indicate that the advertisement video may be skipped by performing the indicated gesture (e.g., the downward flicking gesture). Also, an image or an advertisement copywriting about an advertisement video being played on the advertisement screen 300 may be further included in the moving picture transition inducement element 301 (not shown).

Figure 4:
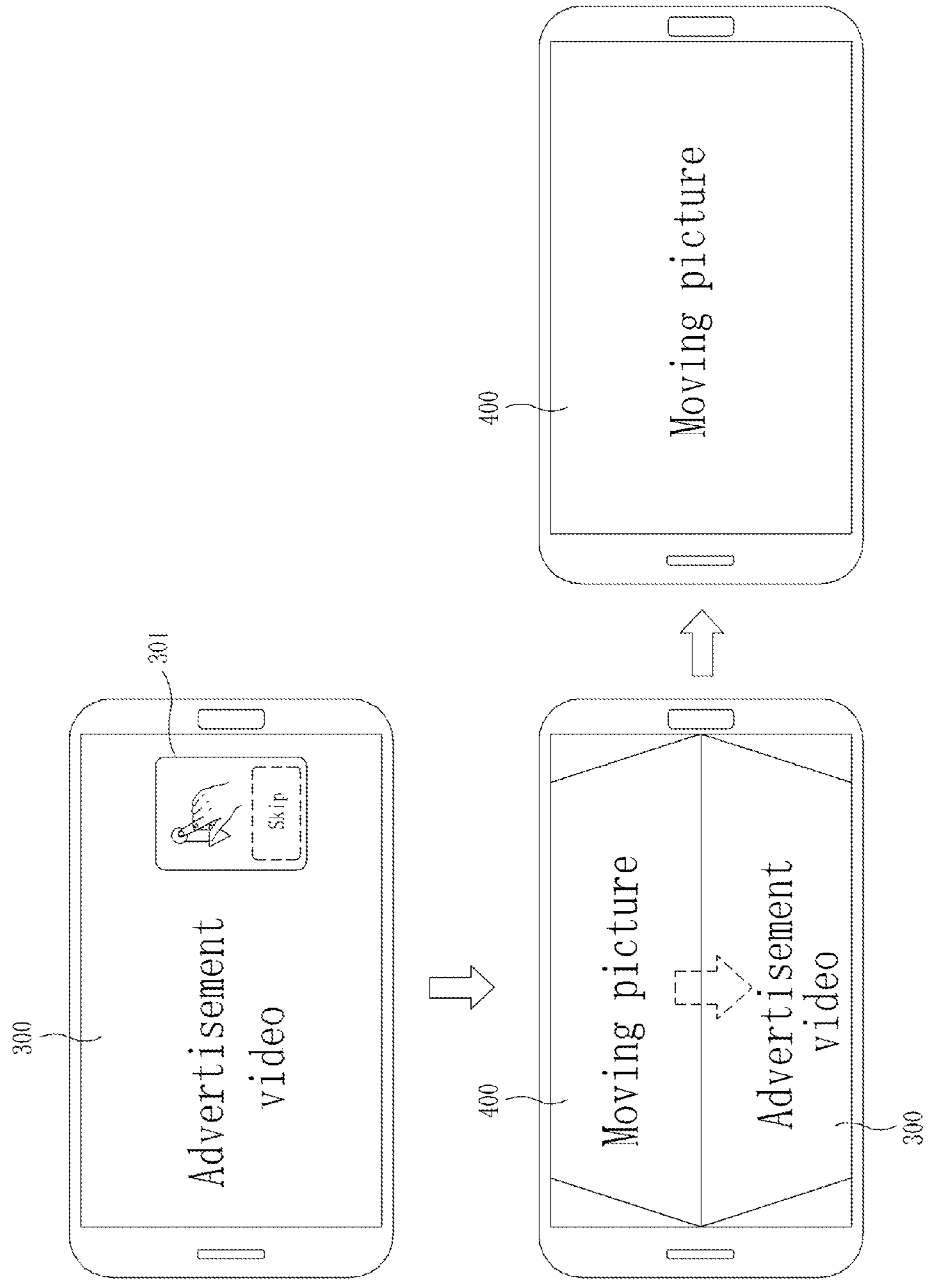

Referring to FIG. 4, in response to a direct touch and/or the advertisement-moving picture gesture by a user on the moving picture transition inducement element 301, a screen transition is performed, which transitions the advertisement screen 300 to a moving picture screen 400 on which the moving picture is played. In various embodiments, a screen transition effect (e.g., a three-dimensional (3D) cube transition) may be provided so that the user may more easily recognize the screen transition from the advertisement screen 300 to the moving picture screen 400 in intuitive and/or visible terms. When the screen transition is terminated, moving picture content may be played on the moving picture screen 400. In various embodiments, the screen transition effect from the advertisement screen 300 to the moving picture screen 400 may be an effect in which a screen transition is performed in a direction matching a direction of the advertisement-moving picture gesture. Furthermore, it should be noted that if the user does not touch the moving picture transition inducement element 301 displayed on the advertisement screen 300 and/or does not perform the advertisement-moving picture gesture, a screen transition to the moving picture screen 400 is performed in response to a completion of the advertisement video and/or termination of playing the advertisement video, which causes the moving picture to automatically start playing.

Figure 5:
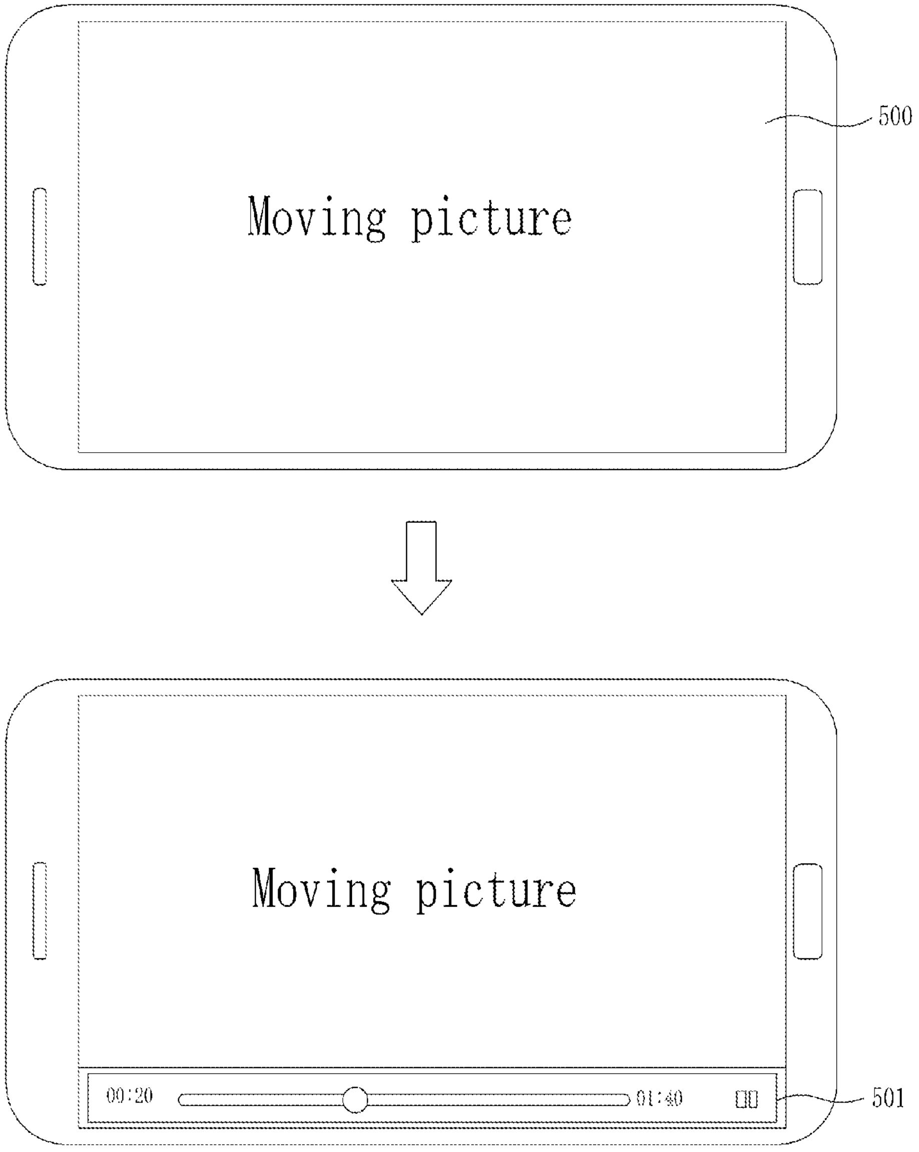

Referring to FIG. 5, in response to a touch and/or gesture of a user on a desired location of a moving picture screen 500 during playing of the moving picture, a moving picture player UI 501 may be displayed on one area. The moving picture player UI 501 allows the user to control the play function of the moving picture. As shown in FIG. 5, the moving picture player UI 501 is displayed at a lower portion of the moving picture screen 500. The play function may include pausing a display of the moving picture, resuming display of the moving picture, rewinding the display of the moving picture, fast forwarding the display of the moving picture, displaying the moving picture at a slower rate of play (i.e., slow motion), and/or other like play functions. As shown in FIG. 5, the moving picture player UI 501 may be provided as a UI bar including function buttons. As shown in FIG. 5, the function buttons may include a pause button and a play button. In various embodiments, the function buttons may include a rewind button, a fast forward button, and/or other like function buttons that allow a user to control a play function of the moving picture.

Figure 6:
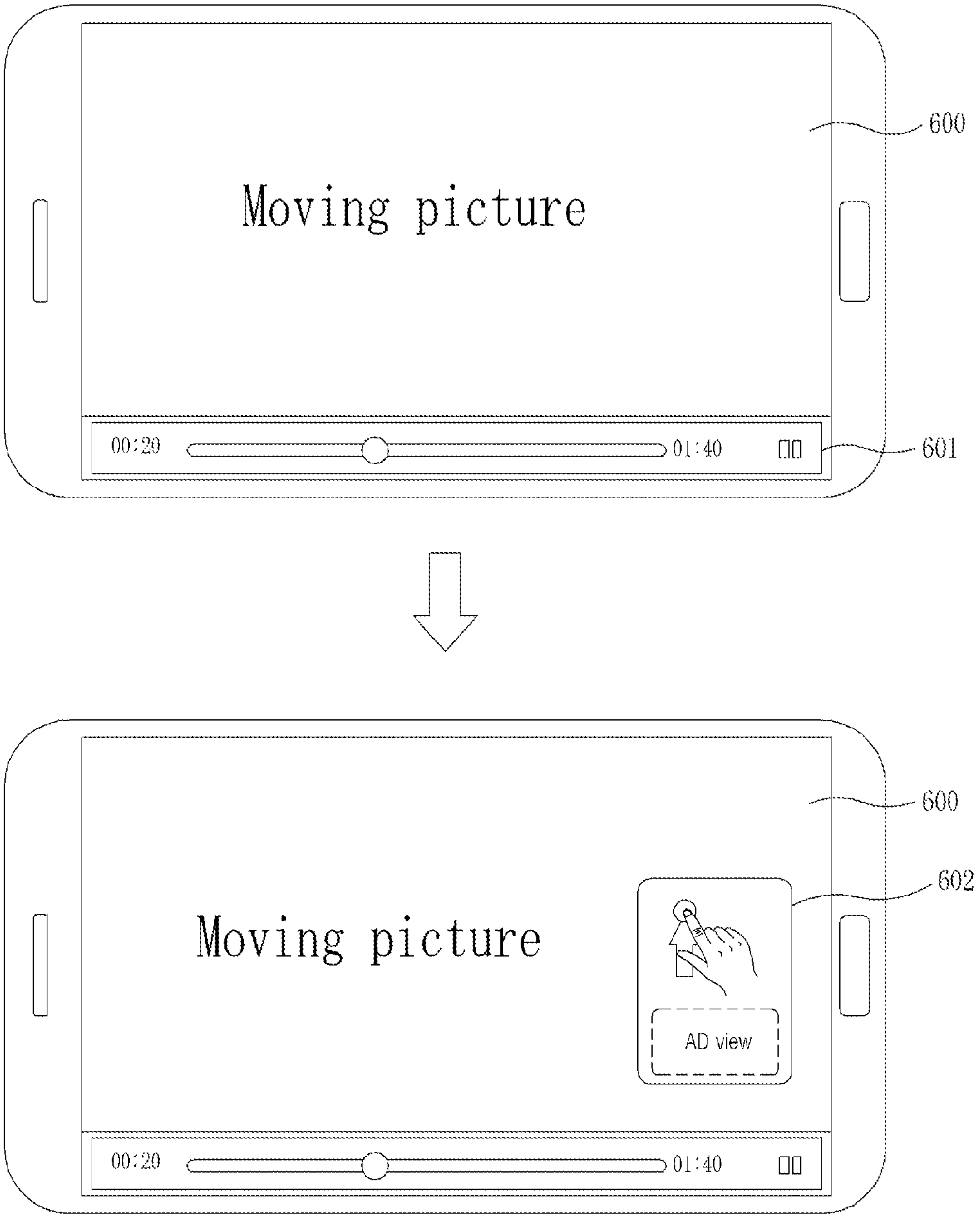

Referring to FIG. 6, a moving picture player UI 601 may be displayed on a moving picture screen 600. The moving picture player UI 601 may be the same or similar to the moving picture player UI 501 discussed with respect to FIG. 5. In various embodiments, if a desired period of time (e.g., one second is elapsed) an advertisement transition inducement element 602 may be displayed as a UI element. The advertisement transition inducement element 602 is capable of inducing a screen transition to an advertisement video having been played before the playing of the moving picture. For example, the advertisement transition inducement element 602 may induce a screen transition to the advertisement video played in the advertisement screen 300 as discussed with respect to FIG. 3. As shown in FIG. 6, the advertisement transition inducement element 602 is displayed on one side area of the moving picture screen 600 on which the moving picture player UI 601 is displayed. The advertisement transition inducement element 602 may have the same or similar functionality as the moving picture transition inducement element 301 as discussed with respect to FIG. 3. For example, the advertisement transition inducement element 602 may include guide information. The guide information and/or "moving picture-advertisement gesture" may include gesture information which indicates a gesture to be performed for issuing a command performing a screen transition to an advertisement video. For example, as shown in FIG. 6, a gesture image indicating an upward flicking is included in the advertisement transition inducement element 602. Also, a subtext for describing a function corresponding to the moving picture-advertisement gesture may be included in the advertisement transition inducement element 602. For example, as shown in FIG. 6, the subtext "AD view" is included in the advertisement transition inducement element 602. In particular, an image or an advertisement copywriting about the advertisement video having been played before playing the moving picture may be further included in the advertisement transition inducement element 602. Accordingly, a user may more easily recognize that a corresponding UI functions to recall a previously played advertisement video. In various embodiments, when no action is taken on the moving picture screen 600 during a desired period of time, the moving picture player UI 601 and the advertisement transition inducement element 602, displayed on the moving picture screen 600 may be processed to be hidden and/or removed from the moving picture screen 600. Also, in response to a touch and/or gesture on a desired location on the moving picture screen 600 other than the moving picture player UI 601 and/or the advertisement transition inducement element 602, the moving picture player UI 601 and/or the advertisement transition inducement element 602 may also be processed to be hidden and/or removed.

Figure 7:
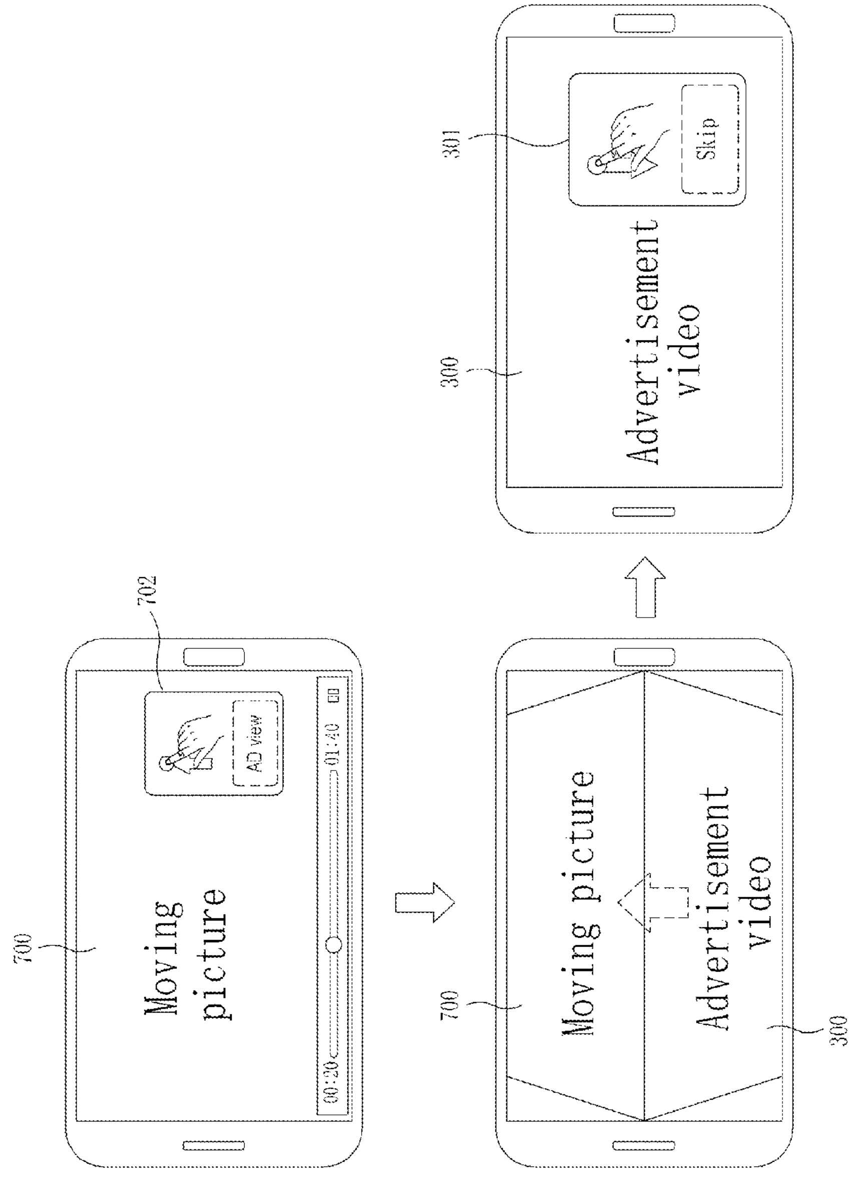

Referring to FIG. 7, in response to a direct touch and/or gesture of a user on an advertisement transition inducement element 702 displayed on a moving picture screen 700 or a moving picture-advertisement gesture, a moving picture being played may be paused, and a screen transition from the moving picture screen 700 to the advertisement screen 300 may be performed again. It should be noted that the moving picture screen 700 may be the same or similar to the moving picture screen 600 as described with respect to FIG. 6. In various embodiments, a screen transition effect, (e.g., a 3D cube transition) may be provided so that the user may easily recognize the screen transition from the moving picture screen 700 to the advertisement screen 300 in intuitive and/or visible terms. Meanwhile, referring to FIG. 8, in response to a moving picture-advertisement gesture of a user taken on a desired area of a moving picture screen 800 on which a variety of elements, such as a moving picture player UI and an advertisement transition inducement element, are processed to be hidden and/or removed, a moving picture being played may be paused and a screen transition from the moving picture screen 800 to the advertisement screen 300 may be performed in the same or similar manner as described with respect to FIGS. 3-7.

Figure 8:
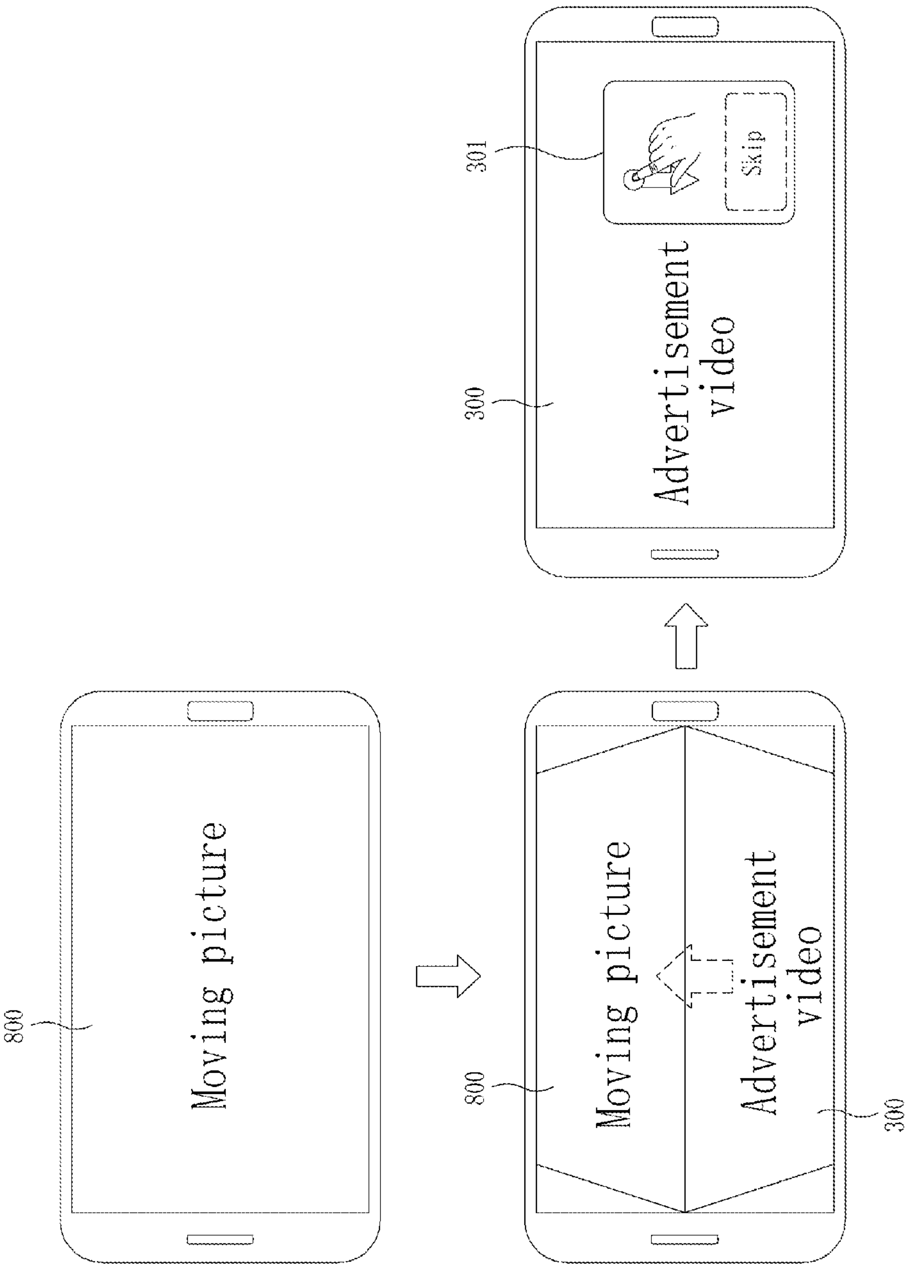

Referring to FIGS. 7 and 8, a screen transition effect from the moving picture screen 700 or 800 to the advertisement screen 300 may be an effect in which a screen transition is performed in a direction matching a direction of a moving picture-advertisement gesture. An advertisement video having been played before playing a moving picture may be recalled and then be played again on the advertisement screen 300 transited from the moving picture screen 700 or 800. The moving picture transition inducement element 301 may be displayed on the advertisement screen 300 from the beginning at which the recalled advertisement video starts being played. In response to a touch and/or gesture of the user on the moving picture transition inducement element 301 displayed on the advertisement screen 300 or the advertisement-moving picture gesture, the advertisement video is terminated and a screen transition from the advertisement screen 300 to the moving picture screen 700 or 800 is performed again and the moving picture automatically resumes from a point in time at which the moving picture is paused. Although the user does not touch the moving picture transition inducement element 301 displayed on the advertisement screen 300 or does not take the advertisement-moving picture gesture on the predetermined area of the advertisement screen 300, a screen transition to the moving picture screen 700 or 800 is automatically performed in response to a termination in playing the advertisement video and the moving picture automatically resumes from a point in time at which the moving picture is paused.

In various embodiments, the previously played advertisement video may be recalled at a point at which the user performed that gesture information indicated by the advertisement transition inducement element. For example, referring to FIGS. 4 and 6, if a user performs the gesture indicated by the moving picture transition inducement element 301 after a one-minute advertisement video plays for thirty seconds, and the user performs a gesture indicated by the advertisement transition inducement element 602 while a moving picture is playing, the one-minute advertisement video may be recalled and/or resumed at the thirty-second point in the one-minute advertisement video. In some embodiments, when the user performs the gesture indicated by the advertisement transition inducement element 602, the one-minute advertisement video may be restarted at the beginning of the one-minute advertisement video. In some embodiments, when the user performs the gesture indicated by the advertisement transition inducement element 602, another advertisement video may be displayed in place of the one-minute advertisement video.

Although example embodiments in which an advertisement video is displayed on a mobile terminal of a user are described, they are only examples to help the understanding of the example embodiments, and thus, the example embodiments are not limited thereto. For example, a configuration layout of a moving picture screen and/or an advertisement screen, elements displayed on the moving picture screen and/or the advertisement screen, methods and/or orders of displaying the elements, and/or transition methods and/or orders therebetween may be modified. In addition, although a description is made based on an example of using a downward flicking gesture for a screen transition from an advertisement video to a moving picture and using an upward flicking gesture for a screen transition from the moving picture to the advertisement video, example embodiments are not limited thereto. Any Type and/or directions of touches and/or gestures, such as upward/downward flicking gestures, left/right flicking gestures, and a diagonal flicking gesture, may be used with respect to a screen transition between the advertisement video and the moving picture. A screen transition effect may also vary based on a type of an applied touch and/or gesture.

Figure 9:
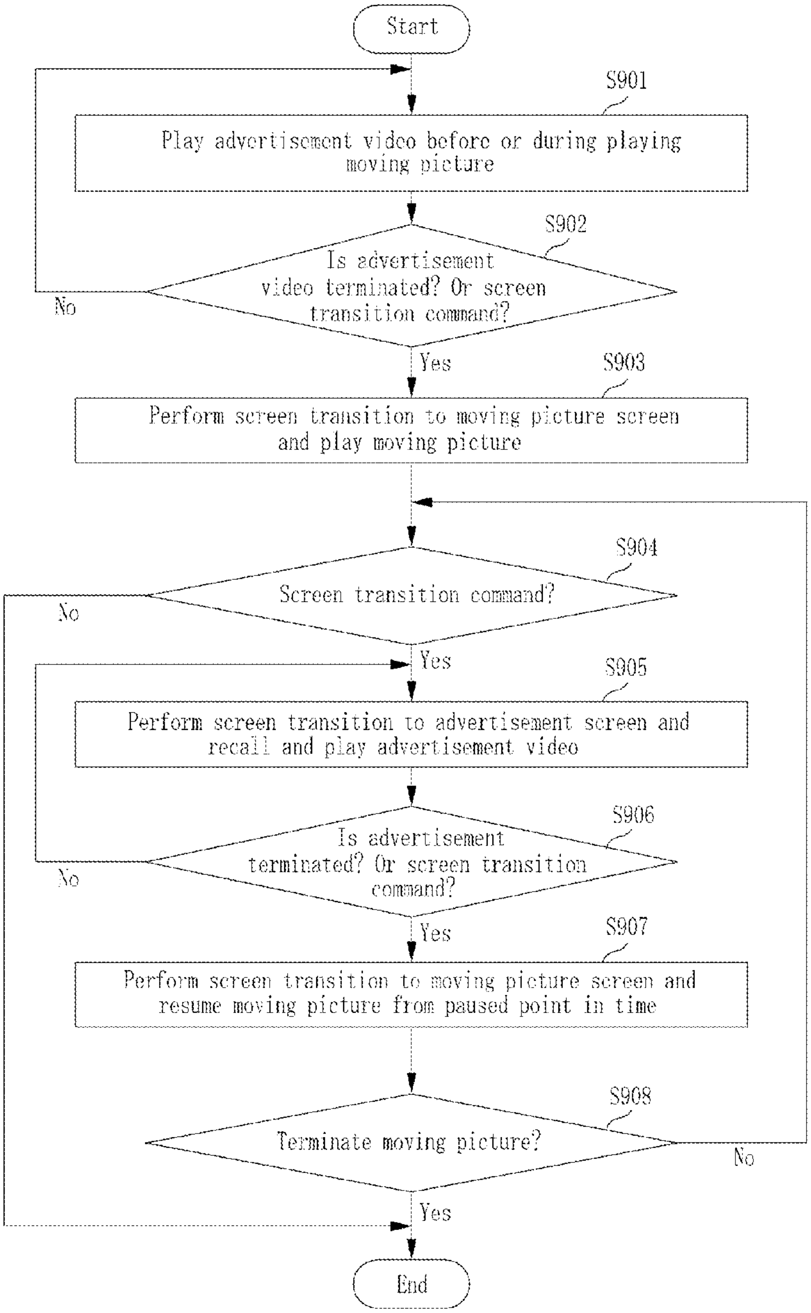
FIG. 9 is a flowchart illustrating a video transition method of a user terminal according to example embodiments.

FIG. 9 is a flowchart illustrating a video transition method according to example embodiments. The video transition method according to example embodiments may be performed by a video transition system included in a user terminal (e.g., user 140).

In operation S901, the video transition system plays an advertisement before or during playing a moving picture. In various embodiments, the video transition system may be provided with moving picture content including an advertisement video through a publisher (e.g., publisher 130), and may play the advertisement video before or during playing a moving picture based on a desired advertisement play time. As an example, in the case of a pre-roll advertisement, the video transition system may initially play an advertisement video before playing a moving picture. As another example, in the case of a mid-roll advertisement, the video transition system may play an advertisement video at a desired point during the moving picture. The mid-roll advertisement video may play during buffering of a data stream associated with the in the course of playing the moving picture. Here, when playing the advertisement video, the video transition system may activate and display a moving picture transition inducement element (e.g., moving picture transition inducement element 301) that is capable of inducing a screen transition to the moving picture on an advertisement screen. Guide information about an advertisement-moving picture gesture and/or a subtext for describing a function of a corresponding gesture may be included in the moving picture transition inducement element. An image and/or an advertisement copywriting about the advertisement video being played may be further included in the moving picture transition inducement element.

In operation S902, the video transition system determines if the advertisement video has been terminated and/or if a screen transition command has been issued. If the video transition system determines that the advertisement video has been terminated and/or a screen transition command has been issued, the video transition system proceeds back to operation S901 to play the advertisement video. If the video transition system determines that the advertisement video has been terminated and/or a screen transition command has been issued, the video transition system proceeds to operation S903 to perform a screen transition from and advertisement screen to a moving picture screen.

In operation S903, the video transition system may perform a screen transition from an advertisement screen to a moving picture screen in response to a termination in playing the advertisement video or a screen transition command input from the user. When the user touches the moving picture transition inducement element on the advertisement screen and/or performs the advertisement-moving picture gesture defined in a screen transition function to the moving picture at a desired location of the advertisement screen, it may be recognized as the screen transition command to the moving picture. In various embodiments, a screen transition effect (e.g., a 3D cube transition) may be applied so that the user may more easily recognize the screen transition from the advertisement screen to the moving picture screen in intuitive and/or visible terms. The screen transition effect from the advertisement screen to the moving picture screen may be a screen transition that is performed in a direction matching a direction of the advertisement-moving picture gesture.

In various example embodiments, when the user pauses the moving picture being viewed and/or calls a moving picture player UI (e.g., moving picture player UI 501), the video transition system may activate a UI capable of inducing a screen transition to the advertisement video. That is, an advertisement transition inducement element may be displayed when the activated UI is displayed on the moving picture screen. In various embodiments, guide information about the moving picture-advertisement gesture and/or a subtext for describing a function of a corresponding gesture may be included in the advertisement transition inducement element. An image and/or an advertisement copywriting about the advertisement video having been played before playing the moving picture to be recalled may be further included in the advertisement transition inducement element.

In operation S904, the video transition system determines if a screen transition command has been issued. If the video transition system determines that a screen transition command has not been issued, the video transition system ends. If the video transition system determines that a screen transition command has been issued, the video transition system proceeds to operations S905 to perform a screen transition from the moving picture screen to the advertisement screen by recalling and playing an advertisement video.

In operation S905, perform a screen transition from the moving picture screen to the advertisement screen by recalling and playing an advertisement video. In response to a screen transition command input from the user after the moving picture has started playing, the video transition system may pause the moving picture being played and may perform a screen transition from the moving picture screen to the advertisement screen. In various embodiments, when the screen transition from the moving picture screen to the advertisement screen may include recalling and playing the advertisement video that was played in operation S901. That is, the video transition system may recall and play a previously played advertisement video in response to a screen transition command input from the user after the moving picture has started playing. In various embodiments, the video transition system may play the previously played advertisement video at a point in which the user executed the screen transition command in operation S902. In some embodiments, the video transition system may recall and play an alternative and/or different advertisement video rather than playing the previously played advertisement video. Here, when the user touches the advertisement transition inducement element on the moving picture screen and/or takes the moving picture-advertisement gesture, it may be recognized as the screen transition command to the advertisement video and/or an advertisement recall request.

In various embodiments, when the advertisement transition inducement element is not displayed on the moving picture screen, the moving picture-advertisement gesture may be input on the entire area of the moving picture screen during playing the moving picture. In such embodiments, the input moving picture-advertisement gesture may be recognized as the advertisement recall request. Furthermore, a screen transition effect example (e.g., a 3D cube transition) may be applied so that the user may more easily recognize the screen transition from the moving picture screen to the advertisement screen in intuitive and/or visible terms. The screen transition effect from the moving picture screen to the advertisement screen may be a screen transition that is performed in a direction matching a direction of the advertisement-moving picture gesture. The moving picture transition inducement element may be displayed on the advertisement screen transited in response to the advertisement recall request, from the beginning at which the advertisement video is played.

In operations S906, the video transition system determines if the advertisement video has been terminated and/or if a screen transition command has been issued. If the video transition system determines that the advertisement video has been terminated and/or a screen transition command has been issued, the video transition system proceeds back to operation S905 to perform a screen transition from the moving picture screen to the advertisement screen by recalling and playing an advertisement video. If the video transition system determines that the advertisement video has been terminated and/or a screen transition command has been issued, the video transition system proceeds to operation S907 to perform a screen transition from and advertisement screen to a moving picture screen and resume the moving picture from a paused point in time.

In operation S907, the video transition system perform a screen transition from and advertisement screen to a moving picture screen and resume the moving picture from a paused point in time. In response to a termination in playing the recalled advertisement video or the screen transition command input from the user, the video transition system may perform a screen transition from the advertisement screen to the moving picture screen and may resume the moving picture from a point in time at which the moving picture is paused. Here, when the user touches the moving picture transition inducement element on the advertisement screen and/or takes the advertisement-moving picture gesture, it may be recognized as the screen transition command to the moving picture, which indicates a pause cancel request.

In operation S908, the video transition system determines if the moving picture has been terminated. If the video transition system determines that the moving picture has been terminated, the video transition system may terminate the process. If the video transition system determines that the moving picture has not been terminated, the video transition system proceeds to operation S904 to determines if a screen transition command has been issued. During playing the moving picture since the initial play of the advertisement video, the video transition system may support an environment in which the advertisement video is recallable through operations S904 through S907.

As described above, the advertisement transition inducement element is displayed at a point in time at which the user pauses the moving picture currently being viewed. In various embodiments, the advertisement transition inducement element is displayed at a point in time at which a moving picture player UI is displayed, and thus, it is possible to decrease a moving picture view obstruction level of the user. Also, in various embodiments where the advertisement transition inducement element or the moving picture transition inducement element is not displayed on the moving picture screen or the advertisement screen, it is possible to enhance a view convenience between the moving picture and the advertisement video by enabling a mutual screen transition through the moving picture-advertisement gesture or the advertisement-moving picture gesture on an entire area of the moving picture screen or the advertisement screen during playing the moving picture or the advertisement video.

A terminal corresponding to the video transition system of FIG. 9 may also perform the video transition method of FIG. 9 according to a control of an application installed in the terminal. In this case, the application may include modules, that when loaded into a processor of the terminal, configures the processor to control the terminal to perform the operations of the video transition methods according to example embodiments. In various embodiments, the application may operate on top of, or in conjunction with a video and/or media player that is already installed in the terminal, without the need to install an additional and/or alternative video and/or media player. A file distribution system for distributing a file for installing the application is described above using the file distribution system 150 of FIG. 1.

Furthermore, it should be noted that, although example embodiments described with respect to FIG. 9 describe the video transition system operates on a touchscreen device, example embodiments are not limited thereto. For example, example embodiments may also operate on non-touchscreen computing devices, such as desktop PCs, laptop PCS, videogame consoles, web-enabled television sets, and the like. In such embodiments, selection devices (e.g., a mouse, television remote control, joystick, and the like) may be used to perform the screen transition functions as described above instead of using touch and/or gesture commands.

Figure 10:
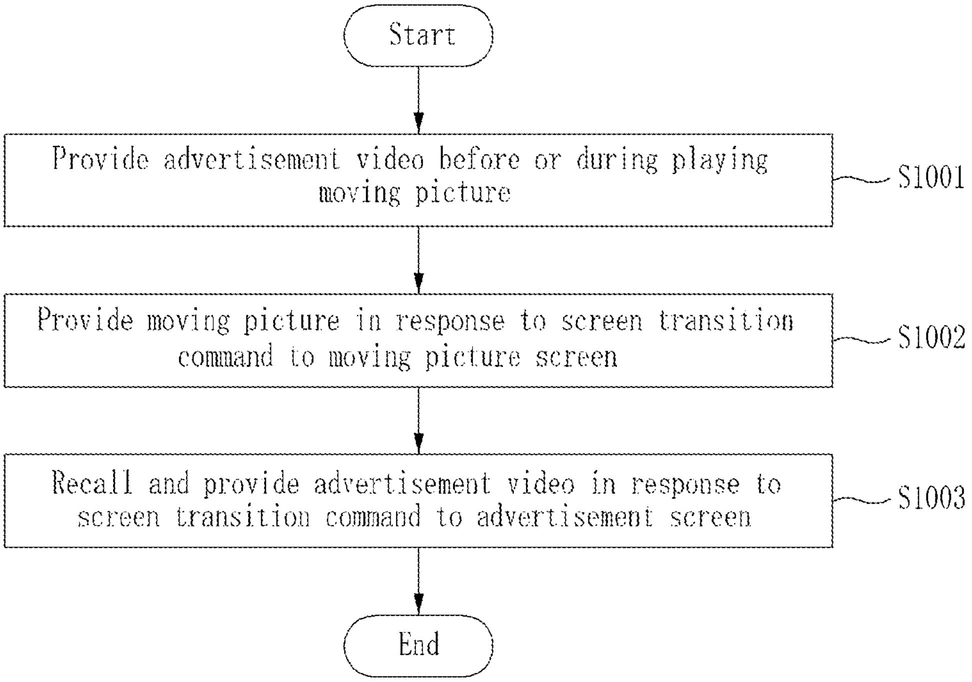
FIG. 10 is a flowchart illustrating a video transition method of a publisher according to example embodiments.

FIG. 10 is a flowchart illustrating a video transition method of a publisher (e.g., publisher 130) according to example embodiments. The video transition method according to example embodiments may be performed by a video transition system corresponding to the publisher 130.

In operation S1001, the video transition system provides an advertisement video before or during playing of a moving picture. In response to a selection of a user on a desired moving picture through a user terminal (e.g., user 140), the video transition system may receive an advertisement video from an advertisement platform (e.g., advertisement platform 120), and may provide an advertisement associated with the desired moving picture. Here, the advertisement platform may randomly select and provide an advertisement video irrelevant to the moving picture, or may extract and provide an advertisement video relevant to the moving picture. As described above, the video transition system may provide the advertisement video in a pre-roll form where the advertisement video is provided before providing the moving picture. Additionally or alternatively, the video transition system may provide the advertisement video in a mid-roll form where the advertisement video is provided at some point while the moving picture is playing. In various embodiments, the mid-roll advertisement video may be played when the user terminal requires buffering of the moving picture.

In operation S1002, the video transition system provides a moving picture in response to a screen transition command from the advertisement video being played to the moving picture (i.e., a first screen transition command). The first screen transition command may include a touch of the user on a moving picture transition inducement element displayed on the advertisement screen during playing the advertisement video, or an advertisement-moving picture gesture taken at a desired location of the advertisement screen. The user terminal may transmit the first screen transition command to the publisher. In response to the first screen transition command received from the user terminal, the video transition system may recognize a point in time at which the screen transition from the advertisement screen to the moving picture screen is performed (i.e., a first screen transition operation), and the video transition system may provide the moving picture from the point in time that the first screen transition operation occurred. The video transition system may store and/or record in an associated database or in another like storage device, (i) the point in time at which the first screen transition command is issued and/or (ii) the point in time at which the first screen transition operation is performed, in order to recall and provide the advertisement video time when a future screen transition command is issued.

In operation S1003, the video transition system recalls and provides an advertisement video in response to a screen transition command from the moving picture to the advertisement video (i.e., a second screen transition command). When the second screen transition command is received from the user terminal, the video transition system may provide the user with the advertisement video provided in operation S1001. The video transition system may refer to the stored point in time of (i) when first screen transition command is issued and/or (ii) when the first screen transition operation is performed, in order to provide the previously played advertisement video. In response to a touch and/or gesture of the user on an advertisement transition inducement element displayed on the moving picture screen, or in response to a moving picture-advertisement gesture taken at a desired location of the moving picture screen, the user terminal may transmit the second screen transition command to the publisher. In response to the second screen transition command received from the user terminal, the video transition system may recognize a point in time at which the second screen transition from the moving picture screen to the advertisement screen is performed, and the video transition system may recall and provide the previously provided advertisement video so that the user may view the previously player advertisement again. The video transition system may store and/or record in an associated database or in another like storage device, (i) the point in time at which the second screen transition command is issued and/or (ii)

the point in time at which the second screen transition operation is performed, in order to recall and provide the moving picture time when a future screen transition command is issued.

The video transition method described above with reference to FIGS. 9 and 10 may refer to the detailed description made above with reference to FIGS. 1 through 8, and may include a more reduced number of operations or additional operations based thereon. Also, at least two operations may be combined and orders or locations thereof may be changed.

According to example embodiments, in the case of a sub-moving picture connected with a main moving picture, a transition between the main moving picture and the sub-moving picture may be performed on a screen without using a list of moving picture or executing a separate menu. Also, according to example embodiments, in the case of an advertisement video connected with a moving picture, it is possible to provide the advertisement video in a recallable form at a point in time desired by a user beyond an advertisement form of displaying the advertisement video once. This allows a use to choose desired times at which to view an advertisement video, thereby increasing an advertising effect of the advertising video and reducing an annoyance and/or frustration of the user associated with viewing advertisements at undesired times while consuming multimedia. Example embodiments provide that it is possible to perform a transition from a moving picture being played to a previous advertisement video having been viewed using a flicking gesture. As described above, by providing a natural and free transition function between the moving picture and the advertisement video using a mobile touch environment, the user may view again the advertisement video during playing the moving picture through a simple flicking gesture. Accordingly, it is possible to satisfy a demand and convenience of the user for viewing again an advertisement, and to enhance an advertisement effect of an advertiser by increasing an advertisement recognition rate and enhancing the access readability through an advertisement redisplay.

Example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variation can be made in the example embodiments without departing from the spirit or scope of the inventive concepts. Thus, it is intended that the example embodiments cover the modifications and variations of the inventive concepts provided they come within the scope of the appended claims and their equivalents.

What is claimed is:

1. A video transition method performed by a user terminal, the method comprising:

receiving, using at least one processor of the user terminal, a first transition gesture in response to a display of a first inducement element while a first moving picture of a plurality of moving pictures is displayed by the user terminal, the first inducement element including the first transition gesture and a first directional indicator indicating a first direction that the first transition gesture is to be performed, the first transition gesture indicating to transition from the first moving picture to a second moving picture of the plurality of moving pictures, wherein the second moving picture is relevant to the first moving picture based on a comparison of a first keyword extracted from the first moving picture and a second keyword registered for the second moving picture;

transitioning, using the at least one processor, from the first moving picture to the second moving picture by performing a first screen transition operation in response to receiving the first transition gesture;

suspending, using the at least one processor, the display of the first moving picture in response to performing the first screen transition operation;

displaying, using the at least one processor, the second moving picture when the first screen transition operation is completed;

receiving, using the at least one processor, a second transition gesture in response to a display of a second inducement element while a second moving picture is displayed by the user terminal, the second inducement element including the second transition gesture and a second directional indicator indicating a second direction that the second transition gesture is to be performed, the second transition gesture indicating to transition from the second moving picture to a first moving picture, wherein the displayed first inducement element and the displayed second inducement element are not displayed simultaneously and the displayed first inducement element and the displayed second inducement element are different from each other;

transitioning, using the at least one processor, from the second moving picture to the first moving picture by performing a second screen transition operation in response to receiving the second transition gesture;

suspending, using the at least one processor, the display of the second moving picture in response to performing the second screen transition operation; and resuming, using the at least one processor, the display of the first moving picture when the second screen transition operation is complete.

2. The video transition method of claim 1, wherein, performing the first screen transition operation includes performing a first screen transition effect corresponding to an input direction of the first transition gesture, and performing the second screen transition operation includes performing a second screen transition effect corresponding to an input direction of the second transition gesture.

3. The video transition method of claim 1, wherein the second moving picture is an advertisement video, the advertisement video being played at one of before and during the display of the first moving picture.

4. The video transition method of claim 1, wherein, the first transition gesture is a desired gesture performed in a first direction, and the second transition gesture is the desired gesture performed in a second direction.

5. The video transition method of claim 1, wherein the first transition gesture is input at a first desired location of a screen of the user terminal when the first moving picture is displayed, and the second transition gesture is input at a second desired location of the screen when the second moving picture is displayed.

6. A video transition method performed by a user terminal, the method comprising:

receiving, using at least one processor of the user terminal, a first transition gesture while a first moving picture of a plurality of moving pictures is displayed by the user terminal, the first transition gesture indicating to transition from the first moving picture to a second moving picture of the plurality of moving pictures;

transitioning, using the at least one processor, from the first moving picture to the second moving picture by performing a first screen transition operation in response to receiving the first transition gesture;

suspending, using the at least one processor, the display of the first moving picture in response to performing the first screen transition operation;

displaying, using the at least one processor, the second moving picture when the first screen transition operation is completed;

receiving, using the at least one processor, a second transition gesture while a second moving picture is displayed by the user terminal, the second transition gesture indicating to transition from the second moving picture to a first moving picture;

transitioning, using the at least one processor, from the second moving picture to the first moving picture by performing a second screen transition operation in response to receiving the second transition gesture;

suspending, using the at least one processor, the display of the second moving picture in response to performing the second screen transition operation; and resuming, using the at least one processor, the displaying of the first moving picture when the second screen transition operation is complete;

wherein the method further comprises, displaying, using the at least one processor, a first inducement element on a screen of the user terminal when the first moving picture is displayed, the first inducement element inducing the first transition gesture and including a first directional indicator indicating a first direction that the first transition gesture is to be performed; and displaying, using the at least one processor, a second inducement element on the screen when the second moving picture is displayed, the second inducement element inducing the second transition gesture and including a second directional indicator indicating a second direction that the second transition gesture is to be performed, and wherein the displayed first inducement element and the displayed second inducement element are not displayed simultaneously, and the displayed first inducement element and the displayed second inducement element are different from each other in accordance with the first transition gesture and the second transition gesture.

7. The video transition method of claim 6, wherein the displaying of the first inducement element comprises:

displaying the first inducement element when the first moving picture is suspended; and displaying the first inducement element when a user interface (UI) associated with the first moving picture is displayed, the UI allowing the user terminal to control a play function of the first moving picture.

8. The video transition method of claim 6, wherein the displaying of the second inducement element comprises:

displaying the second inducement element at a start of the displaying of the second moving picture; and displaying the second inducement element when a desired period of time has elapsed since the start of the displaying of the second moving picture.

9. The video transition method of claim 6, wherein, the first inducement element includes first guide information indicating how to perform the first transition gesture, and the second inducement element includes second guide information indicating how to perform the second transition gesture.

10. The video transition method of claim 6, wherein, the first inducement element includes at least one of (i) an image associated with the second moving picture and (ii) text associated with the second moving picture, and the second inducement element includes the at least one of (i) the image associated with the second moving picture and (ii) the text associated with the second moving picture.

11. The video transition method of claim 6, wherein the resuming the displaying of the first moving picture comprises:

displaying the first moving picture at a point in time of the suspending the display of the first moving picture.

12. The video transition method of claim 6, wherein, the first screen transition operation is performed in response to a selection of the first inducement element, and the second screen transition operation is performed in response to a selection of the second inducement element.

13. A non-transitory computer readable medium comprising program code, which when executed by at least one processor of a user terminal, causes the at least one processor to:

receive a first transition gesture in response to a display of a first inducement element while a first moving picture of a plurality of moving pictures is displayed by the user terminal, the first inducement element including the first transition gesture and a first directional indicator indicating a first direction that the first transition gesture is to be performed, the first transition gesture indicating to transition from the first moving picture to a second moving picture of the plurality of moving pictures, wherein the second moving picture is relevant to the first moving picture based on a comparison of a first keyword extracted from the first moving picture and a second keyword registered for the second moving picture;

transition from the first moving picture to the second moving picture by performing a first screen transition operation in response to receiving the first transition gesture;

suspend the display of the first moving picture in response to performing the first screen transition operation;

display the second moving picture when the first screen transition operation is completed;

receive a second transition gesture in response to a display of a second inducement element while a second moving picture is displayed by the user terminal, the second inducement element including the second transition gesture and a second directional indicator indicating a second direction that the second transition gesture is to be performed, the second transition gesture indicating to transition from the second moving picture to a first moving picture, wherein the displayed first inducement element and the displayed second inducement element are not displayed simultaneously and the displayed first inducement element and the displayed second inducement element are different from each other;

transition from the second moving picture to the first moving picture by performing a second screen transition operation in response to receiving the second transition gesture;

suspend the display of the second moving picture in response to performing the second screen transition operation; and resume the displaying of the first moving picture when the second screen transition operation is complete.

14. A user terminal, comprising:

at least one processor configured to, receive a first transition gesture in response to a display of a first inducement element while a first moving picture of a plurality of moving pictures is displayed by the user terminal, the first inducement element including the first transition gesture and a first directional indicator indicating a first direction that the first transition gesture is to be performed, the first transition gesture indicating to transition from the first moving picture to a second moving picture of the plurality of moving pictures, wherein the second moving picture is relevant to the first moving picture based on a comparison of a first keyword extracted from the first moving picture and a second keyword registered for the second moving picture;

transition from the first moving picture to the second moving picture by performing a first screen transition operation in response to receiving the first transition gesture;

suspend the display of the first moving picture in response to performing the first screen transition operation;

display the second moving picture when the first screen transition operation is completed;

receive a second transition gesture in response to a display of a second inducement element while a second moving picture is displayed by the user terminal, the second inducement element including the second transition gesture and a second directional indicator indicating a second direction that the second transition gesture is to be performed, the second transition gesture indicating to transition from the second moving picture to a first moving picture, wherein the displayed first inducement element and the displayed second inducement element are not displayed simultaneously and the displayed first inducement element and the displayed second inducement element are different from each other;

transition from the second moving picture to the first moving picture by performing a second screen transition operation in response to receiving the second transition gesture;

suspend the display of the second moving picture in response to performing the second screen transition operation; and resume the display of the first moving picture when the second screen transition operation is complete.

15. A user terminal, comprising:

at least one processor configured to, receive a first transition gesture while a first moving picture of a plurality of moving pictures is displayed by the user terminal, the first transition gesture indicating to transition from the first moving picture to a second moving picture of the plurality of moving pictures;

transition from the first moving picture to the second moving picture by performing a first screen transition operation in response to receiving the first transition gesture;

suspend the display of the first moving picture in response to performing the first screen transition operation;

display the second moving picture when the first screen transition operation is completed;

receive a second transition gesture while a second moving picture is displayed by the user terminal, the second transition gesture indicating to transition from the second moving picture to a first moving picture;

transition from the second moving picture to the first moving picture by performing a second screen transition operation in response to receiving the second transition gesture;

suspend the display of the second moving picture in response to performing the second screen transition operation; and resume the display of the first moving picture when the second screen transition operation is complete, wherein the at least one processor is further configured to:

display a first inducement element on a screen of the user terminal when the first moving picture is displayed, the first inducement element inducing the first transition gesture and including a first directional indicator indicating a first direction that the first transition gesture is to be performed; and display a second inducement element on the screen when the second moving picture is displayed, the second inducement element inducing the second transition gesture and including a second directional indicator indicating a second direction that the second transition gesture is to be performed, and wherein the displayed first inducement element and the displayed second inducement element are not displayed simultaneously, and the displayed first inducement element and the displayed second inducement element are different from each other in accordance with the first transition gesture and the second transition gesture.

16. The user terminal of claim 15, wherein, in the displaying of the first inducement element, the at least one processor is further configured to:

display the first inducement element when the first moving picture is suspended; and display the first inducement element when a user interface (UI) associated with the first moving picture is displayed, the UI allowing the user terminal to control a play function of the first moving picture.

17. The user terminal of claim 15, wherein, in the displaying of the second inducement element, the at least one processor is further configured to:

display the second inducement element at a start of the displaying of the second moving picture; and display the second inducement element when a desired period of time has elapsed since the start of the displaying of the second moving picture.

18. The user terminal of claim 15, wherein, the first inducement element includes first guide information indicating how to perform the first transition gesture, and the second inducement element includes second guide information indicating how to perform the second transition gesture.

19. The user terminal of claim 15, wherein, in the resuming the displaying of the first moving picture, the at least one processor is further configured to:

display the first moving picture at a point in time of the suspending the display of the first moving picture.

20. The user terminal of claim 15, wherein, the first screen transition operation is performed in response to a selection of the first inducement element, and the second screen transition operation is performed in response to a selection of the second inducement element.

* * * * *